(12) United States Patent
Hasegawa et al.

(10) Patent No.: US 12,405,753 B1
(45) Date of Patent: *Sep. 2, 2025

(54) ORDERING FILES IN MAGNETIC TAPE STORAGE

(71) Applicant: International Business Machines Corporation, Armonk, NY (US)

(72) Inventors: Tohru Hasegawa, Tokyo (JP); Takahito Tashiro, Mitaka (JP); Takuya Goto, Kodaira (JP); Daisuke Hayashi, Shinjuku-ku (JP); Kazuki Matsumaru, Higashimurayama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,524

(22) Filed: Apr. 4, 2024

(51) Int. Cl.
*G06F 12/00* (2006.01)
*G06F 3/06* (2006.01)

(52) U.S. Cl.
CPC .......... *G06F 3/0682* (2013.01); *G06F 3/0622* (2013.01); *G06F 3/0655* (2013.01)

(58) Field of Classification Search
CPC ..... G06F 3/0682; G06F 3/0622; G06F 3/0655
See application file for complete search history.

(56) References Cited

U.S. PATENT DOCUMENTS

| | | | |
|---|---|---|---|
| 6,581,076 B1 | 6/2003 | Ching et al. | |
| 7,836,080 B2 | 11/2010 | DeBie | |
| 7,971,230 B2 | 6/2011 | Agarwal et al. | |
| 8,266,176 B2 * | 9/2012 | Nakamura | G06F 21/6218 713/193 |
| 10,324,652 B2 * | 6/2019 | Challapalli | G06F 3/067 |
| 10,620,865 B2 | 4/2020 | Hasegawa et al. | |

(Continued)

FOREIGN PATENT DOCUMENTS

| | | | | |
|---|---|---|---|---|
| CN | 101609461 A | * | 12/2009 | |
| CN | 107888474 A | * | 4/2018 | H04L 51/04 |

(Continued)

OTHER PUBLICATIONS

Anonymous, "Improved Reclamation Process through Selective Overwriting of Inactive Data on Sequential Access Media", An IP.com Prior Art Database Technical Disclosure, IP.com No. IPCOM000029462D, Jun. 29, 2004, 3 Pages.

*Primary Examiner* — Tim T Vo
*Assistant Examiner* — Mohammad S Hasan
(74) *Attorney, Agent, or Firm* — CHIP LAW GROUP

(57) ABSTRACT

Mechanisms are provided for writing files to tape storage. A set of files to be written to the tape storage are identified and, for each file, metadata associated with the file indicating identifiers of users associated with the file is retrieved. For each file, a predicted frequency metric, specifying a predicted frequency of access of the file, is determined based on the identifiers of users associated with the file specified in the associated metadata. The files are sorted to generate a ranked set of files in which each file is ranked relative to the other files in the set of files based on their corresponding predicted frequency metric. The ranked set of files is written to the tape storage in descending order of predicted frequency metric such that files having relatively larger predicted frequency metrics are written relatively closer to a starting boundary of a partition of the tape storage.

20 Claims, 12 Drawing Sheets

(56) References Cited

U.S. PATENT DOCUMENTS

| | | | |
|---|---|---|---|
| 10,649,697 B2 | 5/2020 | Hasegawa et al. | |
| 11,010,104 B2 | 5/2021 | Hasegawa et al. | |
| 11,314,439 B2 | 4/2022 | Hasegawa et al. | |
| 11,539,647 B1 * | 12/2022 | Tai | G06F 16/735 |
| 11,662,954 B1 * | 5/2023 | Itagaki | G06F 3/0647 |
| | | | 711/112 |
| 2012/0179868 A1 * | 7/2012 | Haustein | G06F 3/0682 |
| | | | 711/111 |
| 2014/0101160 A1 * | 4/2014 | Prahlad | G06F 11/1466 |
| | | | 707/769 |
| 2016/0291810 A1 * | 10/2016 | Yari | G06F 40/166 |
| 2018/0373457 A1 * | 12/2018 | Challapalli | G06F 3/0647 |
| 2020/0258409 A1 * | 8/2020 | Kasbar | G06F 3/0482 |
| 2023/0140654 A1 * | 5/2023 | Clifford | G06F 16/183 |
| | | | 711/154 |
| 2024/0054158 A1 * | 2/2024 | Hooper | G06F 16/635 |

FOREIGN PATENT DOCUMENTS

| | | | | |
|---|---|---|---|---|
| CN | 110633584 A * | 12/2019 | | G06F 13/1668 |
| CN | 116225317 A * | 6/2023 | | |
| JP | 2005348164 A * | 12/2005 | | |
| JP | 6242326 B2 | 12/2017 | | |
| KR | 20180098409 A * | 11/2016 | | |
| KR | 102365970 B1 | 2/2022 | | |
| WO | WO-2011111115 A1 * | 9/2011 | | G06F 16/11 |

\* cited by examiner

When:

VUL(f1)=(1,0,1,0,1)
VUL(f2)=(1,0,0,1,0)
VUL(f3)=(1,1,0,0,0)
VUL(f4)=(1,1,1,1,0)

$D(f1, f2)$ and $D(f3, f4)$ can be calculated as follows:

$$D(f1, f2) = VUL(f1) \cdot {}^t VUL(f2) = (1,0,1,0,1) \cdot {}^t(1,0,0,1,0) = (1,0,1,0,1) \cdot \begin{pmatrix} 1 \\ 0 \\ 0 \\ 1 \\ 0 \end{pmatrix} = 1$$

$$D(f3, f4) = VUL(f3) \cdot {}^t VUL(f4) = (1,1,0,0,0) \cdot {}^t(1,1,1,1,0) = (1,1,0,0,0) \cdot \begin{pmatrix} 1 \\ 1 \\ 1 \\ 1 \\ 0 \end{pmatrix} = 2$$

FIG. 7

ORDERING FILES IN MAGNETIC TAPE STORAGE

BACKGROUND

The present application relates generally to an improved data processing apparatus and method and more specifically to an improved computing tool and improved computing tool operations/functionality for diagnosing failed Kubernetes nodes.

Hierarchical storage management is a data storage process that moves data within a tiered storage environment. In a tiered storage environment, at least two types of data storage media are delineated by differences in attributes, such as price, performance, capacity, and function. Accordingly, whether data is stored in one tier or another is defined by the requirements of the data to be stored. Typically, data files stored on high-speed storage media are migrated to slower speed storage media if the data files are not used for a period of time.

Many hierarchical storage systems utilize high speed computer hard drives (HDDs), solid state drives (SDDs), and the like to access data quickly, with relatively slower magnetic tape drives being used primarily for archival purposes. Magnetic tape storage is used for archival purposes because of its high capacity, low cost, and long durability. Recently, magnetic tape storage has once again received attention as a data storage solution due to the rise of artificial intelligence (AI) and the need to amass large amounts of data for machine learning and AI purposes. Moreover, various governmental regulations require various industries to record more data for longer periods of time.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for writing files to a tape storage. The method comprises identifying a set of files to be written to the tape storage and retrieving, for each file in the set of files, metadata associated with the file indicating identifiers of users associated with the file. The method further comprises determining, for each file in the set of files, a predicted frequency metric specifying a predicted frequency of access of the file based on the identifiers of users associated with the file specified in the associated metadata. The method also comprises sorting files in the set of files to generate a ranked set of files in which each file is ranked relative to the other files in the set of files based on their corresponding predicted frequency metric. In addition, the method comprises writing the ranked set of files to the tape storage in descending order of predicted frequency metric such that files having relatively larger predicted frequency metrics are written relatively closer to a starting boundary of a partition of the tape storage.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an example illustrating a calculation of vector values for pairings of files in a set of files to be written to a magnetic tape storage in accordance with one illustrative embodiment;

DETAILED DESCRIPTION

The illustrative embodiments provide an improved computing tool and improved computing tool operations/functionality for ordering files on a magnetic tape storage medium so as to improve the search and retrieval speeds for accessing files from the magnetic tape storage medium. While the magnetic tape storage medium is generally used to store data that is not frequently accessed, it has been determined that some files stored to magnetic tape storage are in fact accessed relatively frequently while other files are not read as often due to the number of users that utilize the data. For example, data files including announcement letters to all employees of an organization may be archived on magnetic tape media, but can be accessed from this archive by all employees. Similarly, meeting minutes of an individual division of the organization may likewise be stored to the archive of the magnetic tape media of the organization. It can be seen that the announcement letter data is read more frequently from the magnetic tape media storage than the meeting minutes of the individual division simply due to the relatively larger "audience" for the announcement letter. That is, because more people are accessing the announcement letter, the files will be accessed more frequently than the relatively smaller number of people in the division that will be accessing the files of the meeting minutes.

It should be appreciated that while the description of the illustrative embodiments of the present invention will reference to magnetic tape media or storage for purposes of illustration, the illustrative embodiments are not limited to such. Rather, the mechanisms of the illustrative embodiments may be applied to any storage medium that uses sequential writing and reading in a similar manner to that of magnetic tape media. Whether the data is written magnetically, optically, or through any other data transfer process, the mechanisms of the illustrative embodiments may be used to determine an efficient ordering of the files or data structures to be written and control the writing of those files or data structures to the storage medium.

Figure 1:
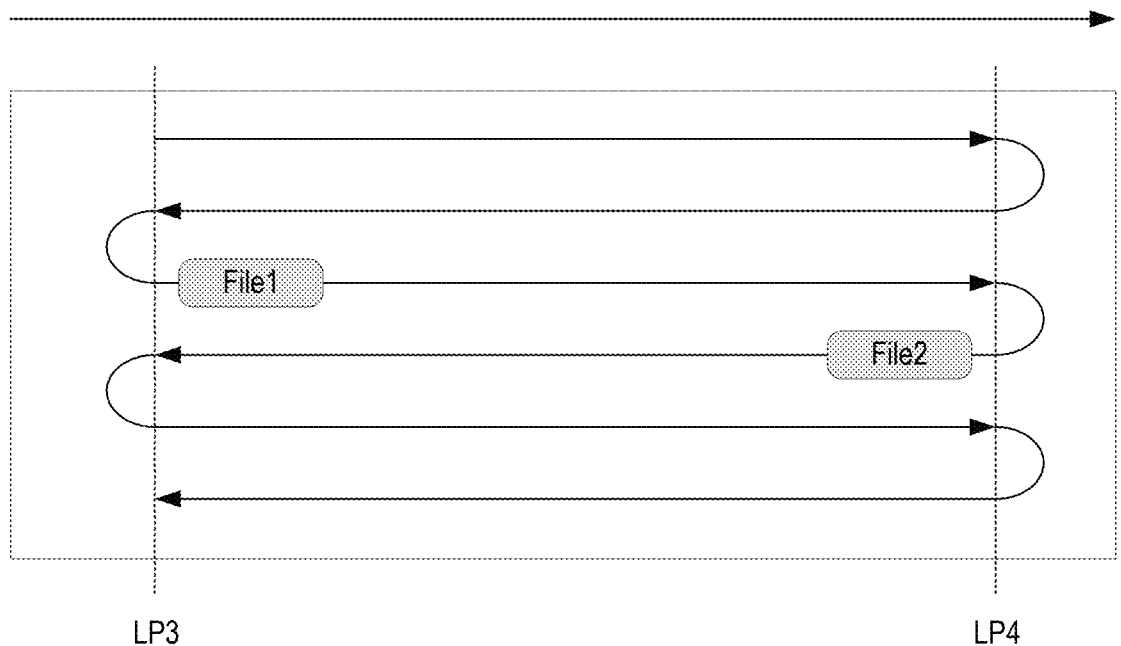
FIG. 1 is an example diagram illustrating a longitudinal repeated reciprocation based writing of data files to a magnetic tape storage medium.

Magnetic tape media is a sequence access device and requires alignment of a head to read data from the magnetic tape medium. As shown in FIG. 1, data is written to the magnetic tape medium by repeated reciprocation in a longitudinal direction of the tape as shown in FIG. 1. A particular user, or group of users, may write their data files to a corresponding user data region whose boundaries are represented in FIG. 1 as longitudinal points (LP) 3 and 4, respectively. Between these boundaries, the data files are written from left to right and right to left as shown by the arrows in FIG. 1. Thus, as shown in FIG. 1, file 1 is written in the vicinity of LP3 and file 2 is written in the vicinity of LP4. It can be seen that when reading data from this user data region, again using a reciprocating read operation, file 1 can be read soon after the magnetic tape cartridge is mounted, whereas it may take much longer, e.g., one or two minutes, to align the tape head of the magnetic tape storage device to read the data of file 2.

Hence, when reading an archived file that is often read from the vicinity of LP4, a significant amount of time is required to read the file from its archived location, and this is more significant the more often that file is read. In addition, when accessing multiple files that are written spaced apart, it will take some time to align the tape head for reading those files and completing the reading is therefore prolonged.

The illustrative embodiments provide an improved computing tool and improved computing tool operations/functionality directed to solving the problems associated with existing magnetic tape media based storage mechanisms with regard to latency in reading data from the magnetic tape media. The illustrative embodiments provide mechanisms for predicting the frequency at which particular data files will be read from the magnetic tape media and positioning the data files in storage locations on the magnetic storage media where the relatively more frequently accessed data files are accessed more quickly. In some illustrative embodiments, these predictions are based on access control lists (ACLs) associated with the data files, assuming that ACLs with relatively larger numbers of users allowed to access the data file being ones that will be accessed more frequently than others. Hence, data files with ACLs encompassing relatively larger numbers of potential parties accessing them will be written to the magnetic tape media at a location that is closer to the beginning of the reciprocating read operation and thus, will require a relatively smaller amount of time to move the tape head to the file's storage location. Moreover, files that can be accessed by the same user are written consecutively as much as possible. As a result, time spent for tape head alignment can be reduced when reading multiple files and files that are accessed by relatively larger numbers of users.

The following description provides examples of embodiments of the present disclosure, and variations and substitutions may be made in other embodiments. Several examples will now be provided to further clarify various aspects of the present disclosure.

Example 1: A method for writing files to a tape storage. The method comprises identifying a set of files to be written to the tape storage and retrieving, for each file in the set of files, metadata associated with the file indicating identifiers of users associated with the file. The method further comprises determining, for each file in the set of files, a predicted frequency metric specifying a predicted frequency of access of the file based on the identifiers of users associated with the file specified in the associated metadata. The method also comprises sorting files in the set of files to generate a ranked set of files in which each file is ranked relative to the other files in the set of files based on their corresponding predicted frequency metric. In addition, the method comprises writing the ranked set of files to the tape storage in descending order of predicted frequency metric such that files having relatively larger predicted frequency metrics are written relatively closer to a starting boundary of a partition of the tape storage. The above limitations advantageously allow for the writing of files that are more likely to be accessed frequently to be written to the tape storage such that they may be accessed more quickly when reading from the tape storage, thereby reducing latency of accessing the files.

Example 2: The limitations of any of Examples 1 and 3-10, where the metadata associated with the file is an access control list (ACL) specifying at least one of user identifiers or group identifiers associated with users or groups of users that are permitted to access the associated file. The above limitations advantageously allow for the access control list of files to be used as a basis for predicting how frequently the corresponding files will be accessed so as to prioritize the writing of these files according to predicted frequency of access to minimize latency in reading the more frequently accessed files.

Example 3: The limitations of any of Examples 1-2 and 4-10, where the predicted frequency metric is a function of a number of unique user identifiers present in the ACL for the file. The above limitations advantageously leverage the information in the ACL with regard to unique user identifiers as an indicator of how frequently the corresponding file is likely to be accessed, e.g., more unique users means a relatively higher likelihood that the file will be accessed more frequently. Thus, files that have relatively larger numbers of users that can access a file will more likely be accessed more frequently and are written closer to the boundary of the partition so that these files can be read more quickly.

Example 4: The limitations of any of Examples 1-3 and 5-10, where determining the predicted frequency measure comprises performing a lookup of user identifiers associated with group identifiers in a directory database and removing duplicate user identifiers from a listing of user identifiers associated with the file. The above limitations advantageously provide an ability to resolve group identifiers to unique user identifiers via the directory database and then remove any duplicates so as a more accurate representation of the number of unique users able to access the files may be determined and thus, a more accurate prediction of the frequency of access of the files.

Example 5: The limitations of any of Examples 1-4 and 6-10, where writing the ranked set of files to the tape storage comprises: determining a first file, in the set of files, having a largest number of user identifiers that are able to access the first file relative to numbers of user identifiers able to access other second files in the set of files; writing the first file to a partition of the tape storage; determining a selected second file having a largest number of user identifiers that are able to access the second file relative to numbers of user identifiers able to access other second files in the set of files; and writing the selected second file at a location substantially immediately subsequent to the first file in the partition of the tape storage. The above limitations advantageously writes files to the tape storage in an ordering where the files having relatively larger numbers of user identifiers able to access the files are written prior to other files having relatively lower numbers of user identifiers. This reduces latency of reading files from the tape storage for frequently accessed files.

Example 6: The limitations of any of Examples 1-5 and 7-10, where the selected second file is a selected section file having metadata specifying an ACL for the selected second file that includes a user identifier matching a user identifier in an ACL of the first file. The above limitations advantageously allows for files that are likely to be accessed by the same user to be written in close proximity to each other on the tape storage as these files have a greater likelihood of being accessed together by the same user.

Example 7: The limitations of any of Examples 1-6 and 8-10, where determining whether a third file in the set of files has a high priority identifier (HID) associated with the third file, where a HID specifies a user identifier of a user that is determined to access the file frequently; and writing the third file to the tape storage at a location in the partition prior to the first file in response to determining that the third file has a HID associated with the third file. The above limitations advantageously allows for the identification of particular users that are known to access files from tape storage more frequently and files having these users' identifiers may be identified and written with higher priority to the tape storage to thereby minimize latency when accessing files from the tape storage.

Example 8: The limitations of any of Examples 1-7 and 9-10, where determining, for each file in the set of files, a predicted frequency metric comprises determining the predicted frequency metric based on a number of unique user identifiers able to access the file, and wherein sorting files in the set of files to generate a ranked set of files is based on both the corresponding predicted frequency metric of the files and a determined commonality of user identifiers associated with different files in the set of files such that files having a relatively greater number of user identifiers in common with each other are ranked closer to each other than files that have a relatively lower number of user identifiers in common with each other. The above limitations advantageously provide a computer functionality for writing files to tape storage so that the files that are more likely to be accessed frequently are written with priority closer to the boundary of a partition of the tape storage, and files that are more likely to be accessed by the same user may be written in close proximity to each other on the tape storage. This reduces latency of accessing these files from the tape storage.

Example 9: The limitations of any of Examples 1-8 and 10, where the tape storage is part of a hierarchical storage system. The above limitations advantageously allow for the tape storage to be part of a hierarchical storage system in which different types of storage media are provided at different tiers of the hierarchy. For example, the tape storage may be in a lower tier of the hierarchy and may be used for archival purposes while higher performance storage devices are used in other higher tiers of the hierarchical storage system.

Example 10: The limitations of any of Examples 1-9, where the operations are executed in a prioritized data file write engine of a storage management system, and wherein the prioritized data file write engine is an extension of a file copy tool used for archiving files to magnetic tape storage media of the tape storage. The above limitations advantageously allow for the mechanisms of the illustrative embodiments to be implemented as extensions and as logic in a storage management system.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a storage management system having prioritized data file write engine for writing data files to magnetic tape media of a magnetic tape storage system based on predictions of frequency of access of the data files. The improved computing tool implements mechanism and functionality, such as the prioritized data file write engine, which cannot be practically performed by human beings either outside of, or with the assistance of, a technical environment, such as a mental process or the like.

The improved computing tool provides a practical application of the methodology at least in that the improved computing tool is able to analyze access control lists of data files and make predictions as to the frequency of access of data files when writing these data files to magnetic tape media. The improved computing tool and improved computing tool operations/functionality improve the speed by which data files are accessed from magnetic tape media by properly positioning the data files in locations of the magnetic tape media where files predicted to be more likely to be accessed often and together are located in locations that are accessed relatively more quickly.

As noted above, magnetic tape media are often used for archival purposes, such as in a hierarchical storage system involving multiple tiers of storage with corresponding hierarchical storage management computing tools. The use of hierarchical storage management allows an organization or enterprise to reduce the cost of data storage, as well as simplify the retrieval of data from slower storage media. Typically, hierarchical storage management is used for deep archival storage of data that is required to be maintained for a prolonged period at low cost. The need for hierarchical storage management stems from the fact that high-speed storage devices (e.g., solid state drive arrays) are more expensive (per byte stored) than slower speed storage devices (e.g., hard disk drives, optical discs, and magnetic tape drives). With hierarchical storage management, infrequently used data files stored on high-speed storage media are migrated to slower speed storage media if the data files are not used (i.e., accessed) for a certain period of time. When access to the data files are required, data is copied or recalled from the secondary storage to the primary storage. In effect, hierarchical storage management turns a fast disk drive into a cache for the slower mass storage devices. With regard to performing such data migration from the secondary storage, e.g., magnetic tape media storage, to the primary storage, the illustrative embodiments provide mechanisms to reduce the latency of such operations with regard to relatively more frequently accessed data files, by controlling the writing of these data files to the secondary storage in manner that the relatively more frequently accessed data files are located in storage locations that can be accessed relatively quicker.

Figure 2:
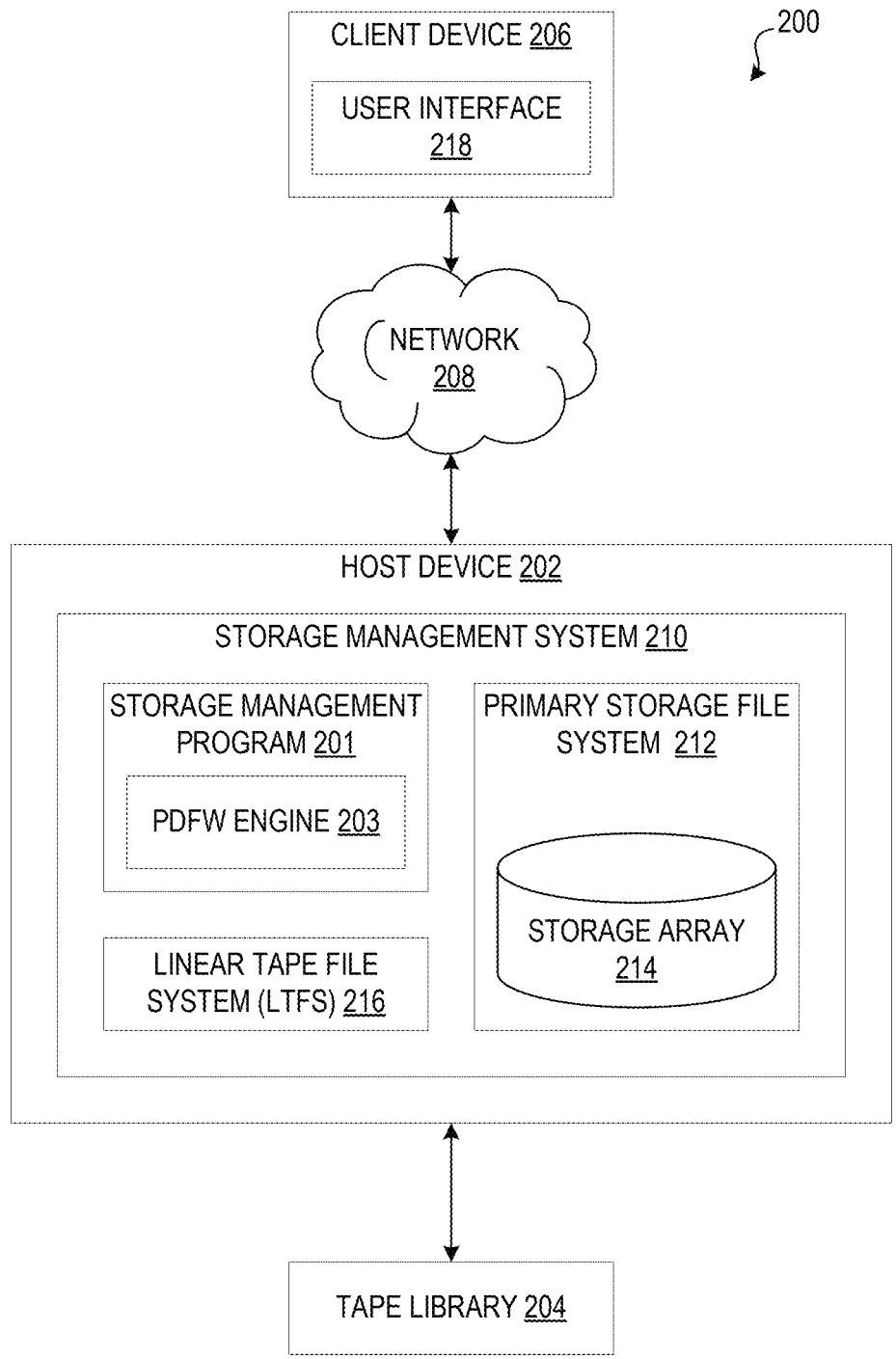
FIG. 2 is a functional block diagram of a network computing suitable for operation of a storage management program in accordance with at least one illustrative embodiment of the present invention.

FIG. 2 is a functional block diagram of a network computing environment, generally designated 200, suitable for operation of a storage management program 201 in accordance with at least one embodiment of the present invention. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

Network computing environment 200 includes host device 202, tape library 204, comprising one or more magnetic tape storage media, and client device 206 interconnected over network 208. In some illustrative embodiments of the present invention, network 208 can be a telecommunications network, a local area network (LAN), a wide area network (WAN), such as the Internet, or a combination of the three, and can include wired, wireless, or fiber optic connections. In some illustrative embodiments of the present invention, network 208 is a storage area network ("SAN"). Network 208 provides block-level network access to storage, such as tape library 204 and storage array 214. Network 208 may include one or more wired and/or wireless networks that are capable of receiving and transmitting data, voice, and/or video signals, including multimedia signals that include voice, data, and video information. In general, network 208 may be any combination of connections and protocols that will support communications between host device 202, tape library 204, client device 206, and other computing devices (not shown) within network computing environment 200.

In various illustrative embodiments of the present invention, host device 202 is a computing device that can be a standalone device, a management server, a web server, a mobile device, or any other electronic device or computing system capable of receiving, sending, and processing data. In other illustrative embodiments, host device 202 represents a server computing system utilizing multiple computers as a server system, such as in a cloud computing environment. In some illustrative embodiments, host device 202 represents a computing system utilizing clustered computers and components (e.g. database server computers, application server computers, web server computers, etc.) that act as a single pool of seamless resources when accessed within network computing environment 200. In general, host device 202 represents any programmable electronic device or combination of programmable electronic devices capable of executing machine readable program instructions and communicating with storage management program 201, tape library 204, client device 206, primary storage file system 212, storage array 214, linear tape file system (LTFS) 216, and other computing devices (not shown) within network computing environment 200 via a network, such as network 208.

Host device 202 includes storage management system 210 comprising a storage management program 201 with a priority data file write (PDFW) engine 203 in accordance with one or more of the illustrative embodiments described herein. In various embodiments, storage management system 210 can migrate and recall data between a primary storage and a secondary storage. For example, storage management system 210 can be a Linear Tape File System-Enterprise Edition (LTFS-EE). While reference is made to IBM-specific hardware and/or software components, it should be understood that aspects of the present invention may be applied equally to other storage management library technologies. In various illustrative embodiments, storage management system 210 can be a local or cloud storage and backup system (e.g., a special storage device, group of devices, etc.) and software, firmware, etc., that can have hierarchical storage management functionality, whereby data can be migrated between tiered storage.

Storage management system 210 includes primary storage file system 212 and storage array 214. For example, primary storage file system 212 can be an IBM General Parallel File System (GBFS) for distributing and managing data across a primary storage, such as storage array 214, that can act as a cache for a secondary storage, such as tape media stored in tape library 204. While reference is made to IBM-specific hardware and/or software components, it should be understood that aspects of the present invention may be applied equally to other file system technologies.

Storage management system 210 further includes linear tape file system (LTFS) 216. A LTFS is a file system that allows files stored on tape media (e.g., tape cartridges) to be accessed in a similar fashion as files stored on a hard disk or flash drive. It requires both a specific format of data on the tape media and software to provide a file system interface to the data. Each LTFS formatted tape media in the tape library 204 appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 216 can be an IBM Linear Tape File System-Library Edition (LTFS-LE) that allows LTFS volumes (i.e., tape media) to be used with a tape library, such as tape library 204. Again, while reference is made to IBM-specific hardware and/or software components, it should be understood that aspects of the present invention may be applied equally to other linear tape storage technologies.

In various illustrative embodiments, storage management system 210 can convert input/output requests directed to tape library 204 to storage array 214. For example, storage management system 210 receives a write request for a record initially directed to be stored on a tape media in tape library 204. However, rather than directly writing the data to a tape media of tape library 206, storage management program 210 writes (i.e., "saves" or "stores") the data as a logical volume (i.e., virtual volume) on a disk cache of storage array 214.

In various illustrative embodiments, storage management system 210 can migrate and/or recall data between a primary, high-speed storage media, such as a hard disk, and a secondary, slower speed storage media, such as a tape media. Accordingly, data may remain on storage array 214 until removal of the data is required, at which point, the data can be migrated to a tape media of tape library 204. For example, data can be migrated from a disk cache to a tape media based on an amount of free space on the disk cache falling below and/or equaling a predetermined threshold value. In another example, data can be migrated from a disk cache to a tape media based on length of time since a file was last accessed. In yet another example, data can be migrated from a disk cache to a tape media based on a user or system administrator selecting files for migration. In accordance with the illustrative embodiments, the storage management system 210 may implement logic, such as a prioritized data file write engine, that positions or locations the data files that are written to the tape media of the tape library 204 in a manner that reduces latency of subsequent read operations for data files predicted to be more likely to be accessed relatively more frequently, as described in greater detail hereafter.

In various embodiments, storage management system 210 can receive read requests. Upon receiving a read request, storage management system 210 can determine whether the data is stored in storage array 214. If the requested data is stored in storage array 214, the data can be read from a disk in storage array 214. However, if the requested data is stored on a tape media in tape library 204, storage management system 210 can recall (i.e., load) the data from the tape media (e.g., a magnetic tape) in tape library 204 to a disk of storage array 214, such that the data is read from the disk. In some illustrative embodiments, if the requested data is stored on tape media in tape library 204, storage management system 210 does not load data from the tape media to a hard disk. In these illustrative embodiments, information can be read directly from the tape media.

Although various components of storage management system 210 are depicted in FIG. 2 as being integrated with host device 202, in alternative embodiments, various components of storage management system 210 can be remotely located from host device 202. For example, one or more of primary storage file system 212, storage array 214, and LTFS 216 can be located on one or more additional computing devices that are logically and/or physically distinct from host device 202.

As shown in FIG. 2, the storage management system 210 further includes storage management program 201 with a priority data file write (PDFW) engine 203. Although storage management program 201 is depicted in FIG. 2 as being integrated with storage management program 210, in alternative embodiments, storage management program 201 can be remotely located from storage management system 210. In some embodiments, storage management program 201 can be a component of storage management system 210. For example, storage management program 201 can be a software component or sub-system of storage management 210. In other illustrative embodiments, storage management program 201 can be logically distinct from storage management program 201. For example, storage management program 201 can be an application running outside of storage management system 210.

Tape library 204 can be an automated tape storage device that includes a plurality of tape drives for writing to and reading from tape media, such as, but not limited to, single-reel or two-reel magnetic tape cartridges. In some illustrative embodiments, tape library 204 can be an IBM TS3400™ Tape Library or an IBM TS3500™ Tape Library. Once again, while reference is made to IBM-specific hardware and/or software components, it should be understood that aspects of the present invention may be applied equally to other tape library technologies. In some illustrative embodiments of the invention, tape library 204 can include a plurality of tape media stored in banks or groups of storage slots. For example, tape media may include, but is not limited to magnetic tape cartridges, magnetic tape cassettes, and optical tape cartridges. Tape library 204 can further include a plurality of slots to hold tape media (e.g., tape cartridges), a barcode reader to identify tape media, and an automated method (e.g., a robot) for loading tape media.

Client device 206 can allow a user to access an application running on host device 202 and/or communicate with storage management program 201 via a network, such as network 208. Client device 206 may be a laptop computer, a tablet computer, a netbook computer, a personal computer (PC), a desktop computer, a personal digital assistant (PDA), a smart phone, or any programmable electronic device capable of receiving, sending, and processing data. In general, client device 206 represents any programmable electronic device or combination of programmable electronic devices capable of executing machine readable program instructions and communicating with host device 202, tape library 204, and other computing devices (not shown) within computing environment 200 via a network, such as network 208.

Client device 206 can include user interface 218. User interface 218 can provide an interface between client device 206, host device 202, and tape library 204. In some embodiments, user interface 218 can be a graphical user interface (GUI) or a web user interface (WUI) and can display text, documents, web browser windows, user options, application interfaces, and instructions for operation, and includes the information (e.g., graphic, text, and sound) presented to a user and the control sequences the user employs to control the program. In some embodiments, user interface 218 can be mobile application software that provides an interface between client device 206, host device 202, and tape library 204.

Figure 3:
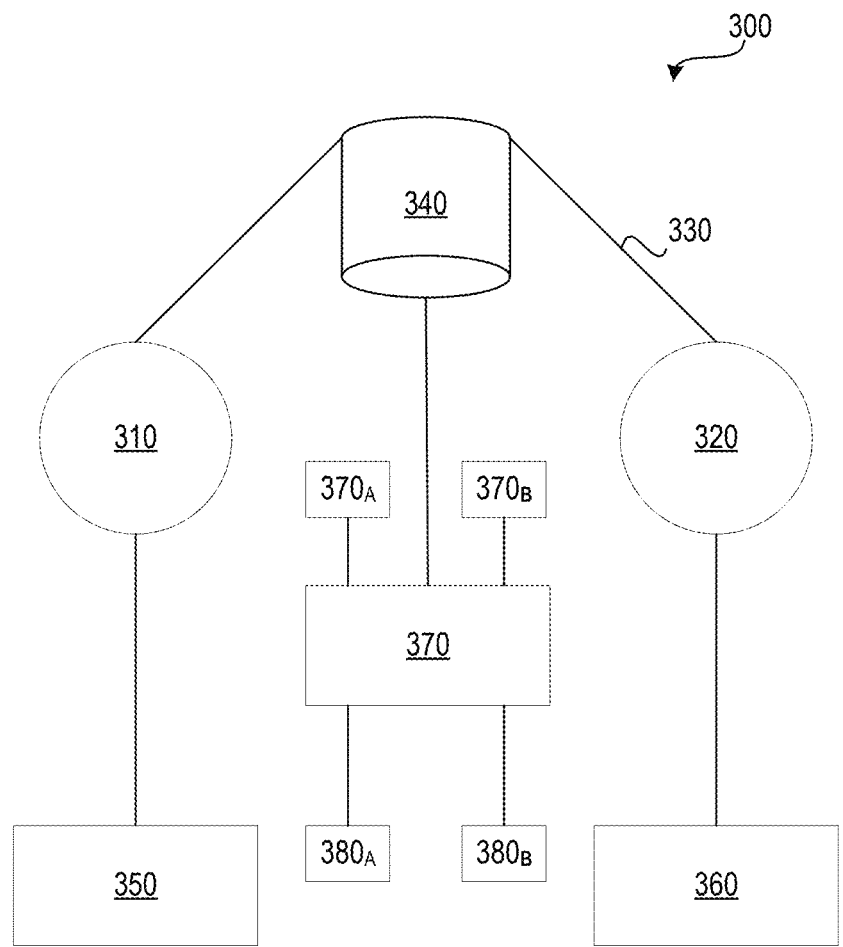
FIG. 3 is a block diagram illustrating a tape system in accordance with at least one illustrative embodiment of the present invention.

FIG. 3 is a block diagram illustrating a tape system, generally designated 300, in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the invention as recited by the claims.

Tape system 300 includes first and second reels 310, 320. Magnetic recording tape 330 is spooled on the first and second reels 310, 320. Magnetic recording tape 330 is routed over tape head 340 for reading and writing data on magnetic recording tape 330. Reel motors 350, 360 control the positioning of magnetic recording tape 330 over the tape head 340. The reel 310, 320, which can supply tape at a particular time, can often be referred to as the "outboard" reel and the reel 310, 320, which can take up the tape at a particular time, can be referred to as the "inboard" reel. Reel motors 350, 360 can be controlled by control system 370, which can include one or more motor operation sensors 380A, 380B and one or more tape radius sensors 370A, 370B which can sense the radius R of magnetic recording tape 330 at the reel 310, 320 the motor 350, 360 is driving. Motor operation sensors 380A, 380B can include electromotive force (EMF) sensors, for example.

Figure 4A:
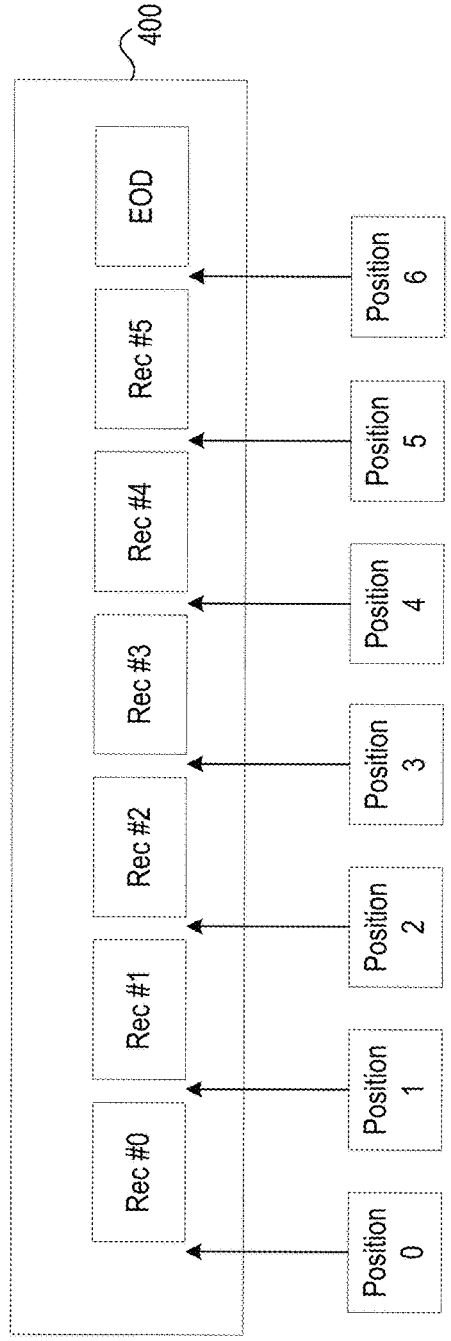
FIG. 4A is a block diagram illustrating an example of data stored on a data partition of a tape media in accordance with at least one illustrative embodiment of the present invention.

FIG. 4A is a block diagram illustrating an example of data stored on a data partition of a tape media, generally designated 400, in accordance with at least one illustrative embodiment of the invention. FIG. 4A provides an illustration of only one implementation and does not imply any limitations with regard to the environments in which different embodiments may be implemented. Many modifications to the depicted environment may be made by those skilled in the art without departing from the scope of the present invention as recited by the claims.

One of ordinary skill in the art will appreciate that although data stored in a LTFS appears to behave like data stored on a hard disk, the fundamental sequential nature of writing data to tape media remains. Data is sequentially written to zones (i.e., logical blocks) of a predetermined, fixed size and files are always appended to the end of the tape media. Furthermore, a LTFS is a write-once file system. In other words, if a file stored on one or more data blocks is modified, overwritten or removed from a tape image, the associated data blocks are not freed up. Rather, the memory allocated to the associated data blocks becomes invalid (i.e., the associated data blocks are no longer referenced in an index) and newly added data is written as separate, non-contiguous blocks at the end of the tape media.

Furthermore, one of ordinary skill in the art will appreciate that unlike a read/write command for a block device, such as a hard disk, a read/write command issued to a tape drive does not specify a block number. In some illustrative embodiments of the present invention, the position of data corresponding to a read/write request can be determined based on the current position of the tape media with respect to the tape head. The current position of the tape media can be retrieved by issuing a "Read Position" command. Similarly, the current position of the tape media can be set to any position by issuing a "Locate/Space" command. When a read/write command is successfully executed, the current position of the tape media is updated.

In some illustrative embodiments of the present invention, data written to tape media stored in tape library 206 can include the following information: (i) record, (ii) file mark ("FM"), and (iii) end of data ("EOD") mark. The term "record" as used herein shall refer to a variable length data sequence on a tape media. The term "file mark" as used herein shall refer to a zero-length separator on a tape media that delimits data (i.e., records) of a particular file. The term "end of data mark" as used herein shall refer to a designation of the end of the data written to a tape media.

As depicted by FIG. 4A, data partition 400 includes Position 0, Position 1, Position 2, Position 3, Position 4, Position 5, and Position 6. Positions 0-6 demarcate physical units of data (i.e., data blocks) of data partition 400. In some illustrative embodiments of the present invention, blocks can include a single record, part of a record, or multiple records. In some embodiments, data blocks can be fixed in size. In some illustrative embodiments, data blocks can be variable in size. Data partition 400 further includes: Rec #0, Rec #1, Rec #2, Rec #3, Rec #4, and Rec #5. Rec #0 and Rec #1 belong to the same file. Recs #2-#5 belong to the same file, and Rec #5 is the end of the data (as indicated by end of data (EOD) mark located at Position 6 written to data partition 400. In some illustrative embodiments of the invention, when a "READ" command is issued, the current position of the tape head is updated. For example, if the current position of a tape head is at Position 1 and a "READ" command is issued for Rec #3, the tape head is moved to Position 3 and Rec #3 is read. Upon completion of reading Rec #3, the current position of the tape head is updated to Position 4.

Figure 4B:
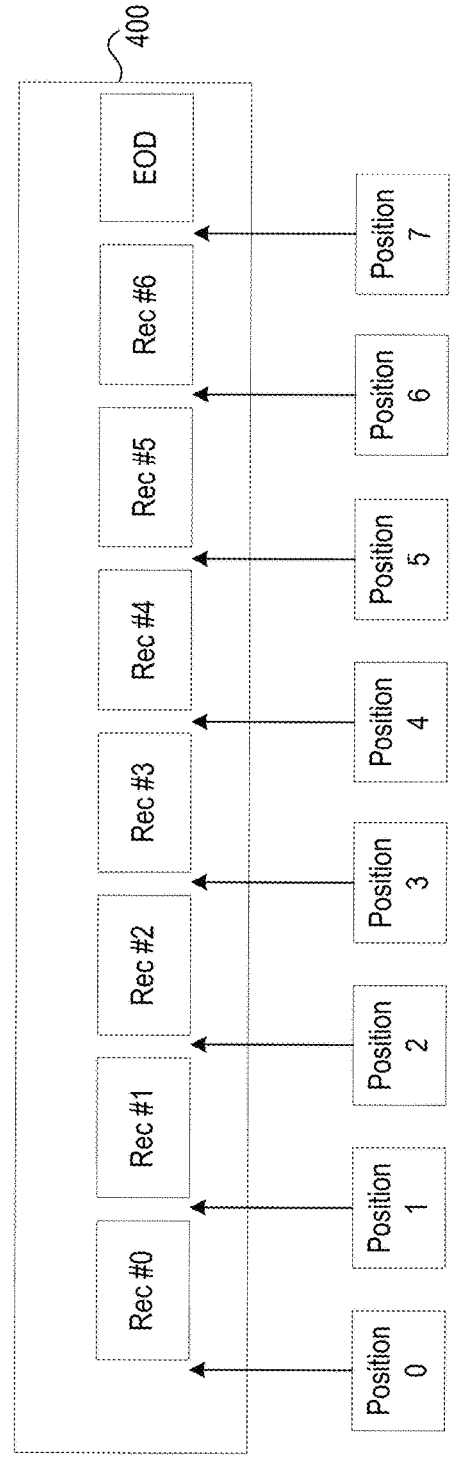
FIG. 4B is a block diagram illustrating an example of data stored on a data partition of a tape media in accordance with at least one illustrative embodiment of the present invention.

FIG. 4B is a block diagram illustrating an example of data stored on a data partition of a tape media, generally designated 400, in accordance with at least one illustrative embodiment of the present invention. FIG. 4B provides an illustration of only one implementation and does not imply any limitations with regard to the environments in which different embodiments may be implemented. Many modifications to the depicted environment may be made by those skilled in the art without departing from the scope of the invention as recited by the claims.

Data partition 400 in FIG. 4B illustrates data partition 400 in FIG. 4A after a "WRITE" command is issued. In some illustrative embodiments of the invention, a "WRITE" command can be issued for one or more of the following: (i) modifying a record, (ii) overwriting a record, and (iii) adding new data. Data partition 400 includes Position 0, Position 1, Position 2, Position 3, Position 4, Position 5, Position 6, and Position 7. Positions 0-6 on data partition 400 in FIG. 4B correspond to Positions 0-6 on data partition 400 in FIG. 4A. Data partition 400 in FIG. 4B further includes: Rec #0, Rec #1, Rec #2, Rec #3, Rec #4, Rec #5, and Rec #6. Recs #0-#5 on data partition 400 in FIG. 4B correspond to Recs #0-#5 on data partition 400 in FIG. 4A. In some illustrative embodiments of the invention, "WRITE" operations can append data to the end of the tape media. As depicted by data partition 400 in FIG. 4B, a "WRITE" command has been issued. Accordingly, since Rec #5 was the last record written to data partition 400 at Position 5 (signified by the EOD mark at Position 6) in FIG. 4A, Rec #6 can be written at Position 6 on data partition 400 and the EOD mark can be updated to Position 7.

Figure 5:
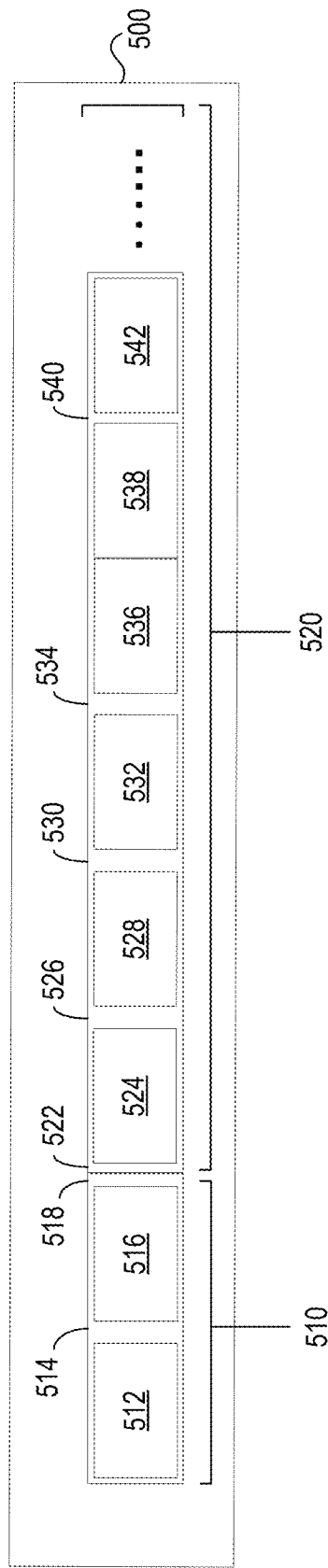
FIG. 5 is a block diagram illustrating an example of a complete partition containing data on a tape media in accordance with at least one illustrative embodiment of the present invention.

FIG. 5 is a block diagram illustrating an example of a complete partition containing data on a tape media, generally designated 500, in accordance with at least one embodiment of the present invention. FIG. 5 provides an illustration of only one implementation and does not imply any limitations with regard to the environments in which different embodiments may be implemented. Many modifications to the depicted environment may be made by those skilled in the art without departing from the scope of the invention as recited by the claims.

As depicted by FIG. 5, partition 500 includes Label Construct 510 and Content Area 520. Label Construct 510 includes Volume Label 512, File Mark 514, LTFS Label 516, and File Mark 518. Content Area 520 includes File Mark 522, Index Construct 524, File Mark 526, Data ExtentA (528), File Mark 530, Index Construct 532, File Mark 534, Data Extents (536 and 538), File Mark 540, Index Construct 542, and File Mark 544.

In various illustrative embodiments, a LTFS volume is comprised of a pair of LTFS partitions-a data partition (i.e., an LTFS partition primarily used for storing data files) and an index partition (i.e., an LTFS partition primarily used to store Index Constructs). Each partition in an LTFS volume includes a Label Construct followed by a Content Area. An LTFS construct as used herein shall be comprised of file marks and records (i.e., logical objects). One type of construct is a Label Construct, which contains identifying information for an LTFS volume. A second type of construct is a Data Extent, which contains file data written as sequential logical blocks. A file consists of zero or more data extents plus associated metadata stored in an Index Construct. A third type of construct is an Index Construct, which contains an index, which is an XML data structure which describes the mapping between files and Data Extents. The Index Construct consists of a file mark, followed by an index, followed by a file mark. The Index of an Index Construct consists of a record that follows the same rules as a Data Extent, but it does not contain file data. In other words, the Index of an Index Construct is written as a sequence of one or more logical blocks of size "block size" using the value stored in the LTFS Label. This sequence of blocks records the Index XML data that holds the file metadata and the mapping from files to Data Extents. The Index XML data recorded in an Index Construct is written from the start of each logical block used. Indexes can also include reference to other Indexes in the volume. References (e.g., back pointers and self pointers) to other Indexes can also be used to maintain consistency between partitions in a volume.

Figure 6:
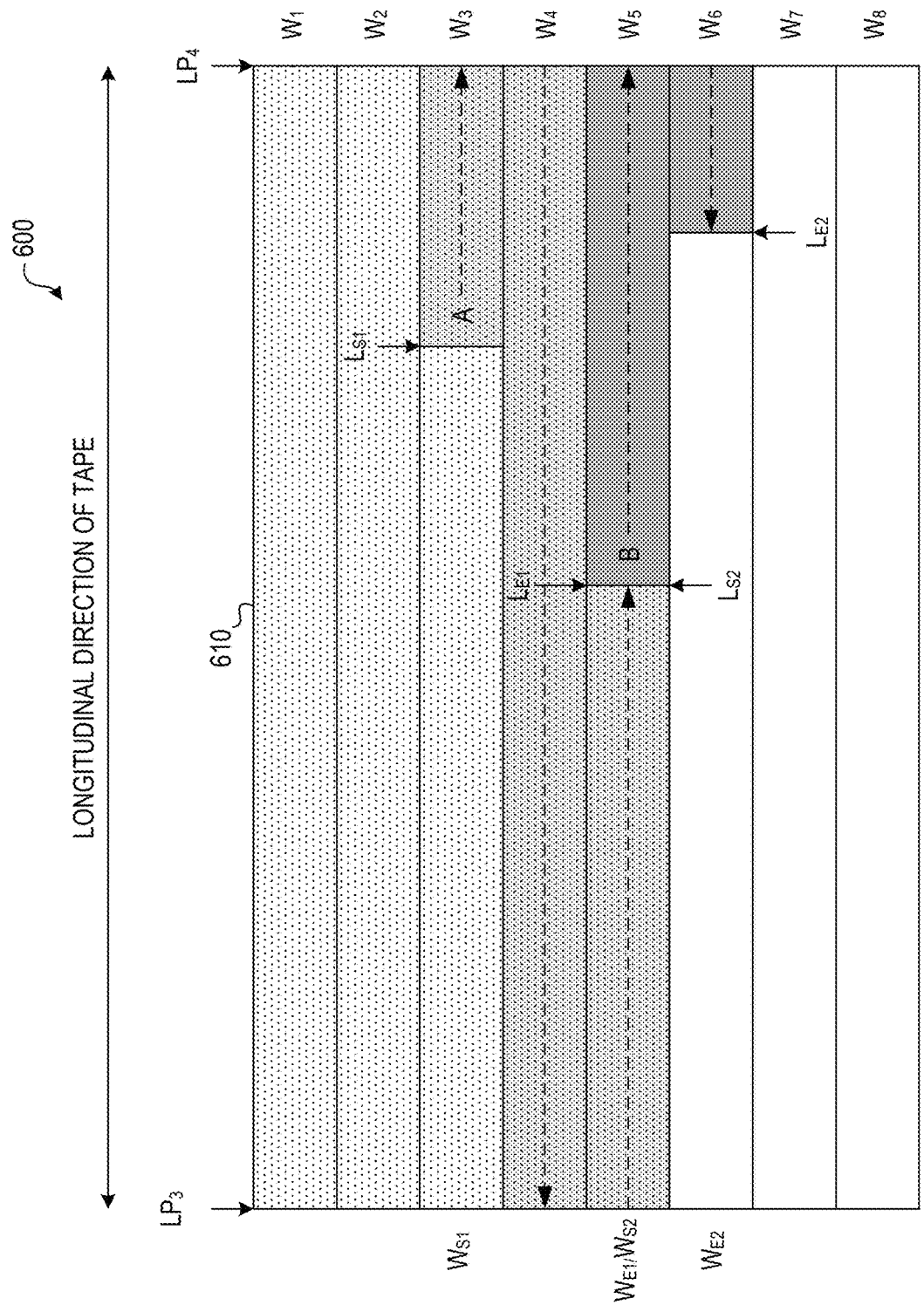
FIG. 6 is a block diagram illustrating an exemplary linear serpentine recording in accordance with at least one illustrative embodiment of the present invention.

FIG. 6 is a block diagram illustrating an exemplary linear serpentine, or reciprocating, recording, generally designated 600, in accordance with at least one embodiment of the present invention. More specifically, FIG. 6 is representative of a single tape head writing data to a data partition of a tape media. FIG. 6 provides an illustration of only one implementation and does not imply any limitations with regard to the environments in which different embodiments may be implemented. Many modifications to the depicted environment may be made by those skilled in the art without departing from the scope of the invention as recited by the claims.

One of ordinary skill in the art will appreciate that with a linear serpentine, or reciprocating, recording, a tape drive includes more tracks than tape heads, although each tape head only writes one track at a time. After making a pass over the whole length of the tape media, all heads shift slightly and make another pass in the reverse direction (i.e. Wrap), writing another set of tracks. This procedure is repeated until all tracks have been written.

Referring now to FIG. 6, a data partition 610 of a tape media can be seen similar to FIG. 1, wherein $LP_3$ and $LP_4$ are a recording start position and a recording end position of the data storage area (i.e., data partition) in the longitudinal direction of the tape media, respectively. In the first Wrap ($W_1$), data is recorded from $LP_3$ to $LP_4$. In the second Wrap ($W_2$), data is reversely recorded from $LP_4$ to $LP_3$. In the third Wrap ($W_3$), data is recorded from $LP_3$ to $LP_4$. It should be appreciated that data may continue to be recorded in this alternating pattern based on a total Wrap capacity of the tape media. In various embodiments, an index partition including an index is stored at the beginning of the first Wrap.

As further depicted in FIG. 6, File "A" has been recorded from position $L_{S1}$ to position $L_{E1}$ on the tape media. More particularly, File "A" is recorded in Wrap $W_3$ from starting position $L_{S1}$ to $LP_4$, in Wrap $W_4$ from $LP_4$ to $LP_3$, and in Wrap $W_5$ from $LP_3$ to position $L_{E1}$. Additionally, File "B" has been recorded from position $L_{S2}$ to position $L_{E2}$ on the tape media. More particularly, File "B" is recorded in Wrap $W_5$ from position $L_{S2}$ to position $LP_4$, and in Wrap $W_6$ from position $LP_4$ to $L_{E2}$.

One of ordinary skill in the art will appreciate that although data block numbers are sequential on the tape media, data block numbers do not indicate the recording position and/or direction of recording (i.e., $LP_3$ to $LP_4$ or vice versa) of a record or file on the tape media itself. Rather, the recording position of a record or file on the tape media is indicated by a position in a longitudinal direction of storage on the tape media (hereinafter referred to as "LPOS") and a position in a lateral direction perpendicular to the longitudinal direction (hereinafter referred to as "Wrap"). However, although a tape drive reads and writes data based on LPOS and Wrap, a tape drive is unaware of which particular Wrap and LPOS of a particular Wrap a record or file is being recorded.

In various illustrative embodiments, when a record and/or file is recorded on a secondary storage media, such as a tape media, storage management program 201 obtains information on the recording position of the record and/or file. In these illustrative embodiments, a tape drive writes a record and/or file to a tape media, and storage management program 201 obtains the actual position of the record and/or file written on the tape media from the tape drive. More particularly, storage management program 201 identifies the particular Wrap and LPOS at the start of writing and the particular Wrap and LPOS at the end of writing a particular record and/or file from the tape drive. Storage management program 201 stores the information on the recording position of the record and/or file in an index on a primary storage media, such as hard disk drive in storage array 214, and on a secondary storage media, such as a tape media in tape library 204, for read access to the record and/or file.

In some illustrative embodiments, storage management program 201 obtains (e.g., via a small computer system interface (SCSI) command) Wrap and LPOS information from sense data or mode page data indicating the operating state of a tape drive. In these illustrative embodiments, the sense data and mode page data can include, in addition to information on a record and/or file recording start position and end position, the positional information of the head, from which the Wrap and LPOS of the head can be obtained. In other illustrative embodiments, storage management program 201 obtains Wrap and LPOS information via a command to specify write data and obtain Wrap and LPOS from a tape drive.

Referring back to FIG. 6, after data is recorded on the tape media, storage management program 201 obtains information on the starting longitudinal position ($L_{S1}$) and ending longitudinal position ($L_{E1}$) of File "A" written to data partition 610 of the tape media. Similarly, storage management program 201 obtains information on the starting longitudinal position ($L_{S2}$) and ending longitudinal position ($L_{E2}$) of File "B" written to data partition 610 of the tape media. Additionally, storage management program 201 obtains the starting Wrap ($W_{S1}$) and the ending Wrap ($W_{E1}$) of positions $L_{S1}$ and $L_{E1}$. Similarly, storage management program 201 obtains the starting Wrap ($W_{S2}$) and the ending Wrap ($W_{E2}$) of positions $L_{S2}$ and $L_{E2}$. Accordingly, an extent for File "A" including $L_{S1}$ at $W_{S1}$ (i.e., Wrap $W_3$) and $L_{E1}$ at $W_{E1}$ (i.e., Wrap $W_5$) is appended to an index. Similarly, an extent for File "B" including $L_{S2}$ at $W_{S2}$ (i.e., Wrap $W_5$) and $L_{E2}$ at $W_{E2}$ (i.e., Wrap $W_6$) is appended to an index. In some embodiments, storage management program 201 stores the information associated with the recording positions as extents in an index on a primary storage media, such as a hard disk in disk array 216 (shown in FIG. 2). In other illustrative embodiments, storage management program 201 issues a command to the tape drive to write the information associated with the recording position as extents in an index on the tape media.

With magnetic tape media based storage systems implementing LTFS, search mechanisms, such as a search server and search index, may be used to find and access the files stored on the magnetic tape media. For example, when data are stored in multiple Contents Management Systems, such as file servers, notes database, and share points within an enterprise, a search system such as Enterprise Search Server is may be introduced and used. Enterprise Search Server captures data stored in these multiple Contents Management Systems and extracts data contents and metadata to prepare an index for search. Thus, irrespective of where data are stored, users can retrieve data by using keywords or natural languages in Enterprise Search Server to obtain required data information and access contents as shown in FIG. 2.

In large enterprises, appropriate access authority may be set in each Contents Management System for data management, e.g., via access control lists (ACLs) and corresponding logic for controlling access to data based on such ACLs. In such cases, access rights are also managed in Enterprise Search Sever so that only appropriate contents can be displayed in search results depending on the particular users attempting to search for and access the data. Mechanisms for implementing such a function of adjusting search results according to the access rights of each user in an Enterprise Search Server is referred to as a Secure Search herein.

For example, a search index may be generated in the Enterprise Search Server and used to perform the Secure Search operations across a plurality of different systems, such as a file server, share point, notes database, or the like. In the case of using mass data archived on a magnetic tape media in secondary storage, when data are archived to the magnetic tape media using LTFS, the search index for searching by such an Enterprise Search Server and Secure Search mechanisms may be as shown in Table 1 below. This table can be used continuously utilized by simply changing location details as shown in Table 2 below.

TABLE 1

Example of Search Index

| ID | FileName | FileType | ACL | Location |
|---|---|---|---|---|
| 0001 | SalesMeeting20230105.pptx | ppt | user1; user2 | Fileserver1: /mnt/data . . . |
| 0002 | DevTeamAllHans1Q.pdf | pdf | user1; user3 | https: //xxx.sharepoint . . . |
| 0003 | SalesMeeting20230112.pptx | ppt | user1; user2 | Fileserver1: /mnt/data . . . |

TABLE 2

Example of Search Index using LTFS

| ID | FileName | FileType | ACL | Location |
|---|---|---|---|---|
| 0001 | SalesMeeting20230105.pptx | ppt | user1; user2 | TAPE1: /mnt/data . . . |
| 0002 | DevTeamAllHans1Q.pdf | pdf | user1; user3 | TAPE1: //xxx.sharepoint . . . |
| 0003 | SalesMeeting20230112.pptx | ppt | user1; user2 | TAPE1: /mnt/data . . . |

As shown in Tables 1 and 2, the search index includes the access control list (ACL) information for the various files. The illustrative embodiments of the present invention may operate on this ACL information associated with the files when writing the data to locations on the magnetic tape media so as to improve read access of these files during subsequent search and retrieval of the files from the magnetic tape media.

In accordance with one or more of the illustrative embodiments, when using LTFS to archive files onto magnetic tape media, files corresponding to one tape are prepared first and then archived. For archiving, ACLs of files are processed and evaluated so as to identify files that are accessible by a relatively large number of users may be identified. The term "large" refers to a number of users that meets or exceeds a predetermined threshold number of users or files that have characteristics that are indicative of the files being likely to be accessed frequently by various users. It should be appreciated that while the number of users is described herein as a primary factor in determining which files are more frequently used, other criteria, based on characteristics of the data files, e.g., metadata of the file, ACLs, and the like, may be used to determine a prediction of a relative frequency of access of data files and prioritize the writing of the data files to locations on the magnetic tape media. In this way, the files with many users being permitted to access the files, such as determined from the ACLs, for example, may be written to locations in partitions of the magnetic tape media that are relatively closer to a start boundary of the partition, e.g., closer to LP3 than LP4 in FIG. 1 and allowed to access are written in the vicinity of LP3.

Thus, in accordance with one or more illustrative embodiments, it is assumed that files, with ACLs that comprise many users and/or user groups that are allowed to access those files, are highly likely to be read often. By positioning such files closer to the boundaries of a partition, e.g., boundary LP3, the shorter the movement of the tape head needed to position the tape head for reading the file. Thus, less time is required to access those files. As these are the more frequently accessed files, the time savings for accessing those files is increased, i.e., each read operation is more efficiently performed with lower read times. Moreover, files that are likely to be accessed by the same user, or group of users, may also be positioned at storage locations near each other such tat consecutive reads may be performed more quickly. Thus, time spent for the tape head alignment can be reduced when reading multiple files from the magnetic tape media.

The prioritized data file write (PDFW) engine 203 of the illustrative embodiments may be implemented as part of the storage management system 210, and specifically the storage management program 201. For example, the PDFW engine 203 may be implemented as an extension of a file copy tool for use in archiving files on a magnetic tape media. In some illustrative embodiments, the mechanisms of the illustrative embodiments may operate with hierarchical storage management (HSM) by implementing a file copy tool, such as a linear tape file system (LTFS) copy tool, or the like.

Before starting an actual copy of files, in accordance with one or more illustrative embodiments, the prioritized data file write (PDFW) engine 203 reads the ACL of each file to be archived and obtains user IDs allowed to access each file. Assuming that ACL of the file f is ACL(f), ACL(f) contains user IDs or group IDs for users/groups that are permitted to access the file. For example, ACL(f) may be of the type: ACL(f)=user1, user2, group1, group2, group3.

If the ACL for a file contains a group ID, e.g., group1, the PDFW engine 203 executes operations to determine the members of that group ID. For example, in some illustrative embodiments, the PDFW engine 203 may transmit one or more inquiries/requests to appropriate computing systems to retrieve the user IDs associated with the group ID, e.g., sending inquiries/requests to a server, such as LDAP Server or the like, which manages the group ID. The PDFW engine 203 receives the response to the inquires/request which provides details of the group ID which includes the user IDs included in the group ID.

User IDs, including the user IDs associated with the group IDs, in the ACL are sorted out as strings, which are referred to as the User List (UL). The number of user IDs in the UL are referred to as the Number of Users (NU). Specifically, the UL of the file f is referred to as UL(f) and Number of Users thereof is referred to as NU(f), and the UL is obtained from the ACL of the file f and the NU is determined from the number of unique user IDs in the UL. For example, considering the example ACL above, i.e., ACL(f)=user1, user2, group1, group2, group3, assuming group1 includes user1 and user4, group2 includes user2 and user3, and group3 includes user2 and user5, UL and NU are expressed as follows: UL(f)=user1, user2, user3, user4, user5 and NU(f)=5.

The PDFW engine 203 of the illustrative embodiments creates ULs for all files to be copied to the magnetic tape media, such as part of a data migration operation from primary storage to secondary storage as discussed previously. User IDs contained in all ULs are sorted as strings by excluding any duplications, which is referred to as an aggregated user list (AUL). The AUL stores only unique user IDs across all files to be copied to magnetic tape media, e.g., AUL=user1, user2, user3 . . . , userN.

The PDFW engine 203 compares UL(f) of each file f with the AUL that stores the unique user IDs across all files to be copied. Based on the comparison, a vector user list (VUL) is generated for each file, where the vector comprises vector slots for each unique user ID in the AUL, and vector slot values are set to values corresponding to whether the corresponding user ID is present in the UL for the file f, i.e., present in UL(f). Thus, for example, if the AUL comprises user IDs user1, user2, user3, user4, user5, then the VUL will have five vector slots. If a user list (UL) for a file f, i.e., UL(f), has user identifiers user1 and user 3, then the VUL for file f would be {1, 0, 1, 0, 0}, where a value of 1 indicates that the user ID is present in the UL(f) and a value of 0 indicates that the user ID is not present in the UL(f).

The vector user list of file f, i.e., VUL(f), is treated as a vector and a function D may be defined that expresses the number of users that can access each of a plurality of files. For example, assuming that the illustrative embodiment operates on a pair of files, the function D may be defined as follows:

$$D(f1, f2) := VUL(f1) \cdot {}^t VUL(f2) \quad (1)$$

where f1 is a first file, f2 is a second file, VUL(f1) is the VUL for file f1, VUL(f2) is the VUL for file f2, and $^t$VUL(f2) is the transpose of the vector VUL(f2). It should be appreciated that while Equation (1) above is for a pair of files, a similar function D may be provided for more than two files. Moreover, this pairing may be performed a plurality of times for a plurality of pairings of files so as to generate a number of users for each pairing of files and utilize these values to determine a predicted measure of frequency of access in a manner similar to that described hereafter.

FIG. 7 shows an example calculation of the function D in accordance with Equation (1) but for two pairings of files, i.e., $f_1$ and $f_2$, and $f_3$ and $f_4$. The files $f_1$ to $f_n$ may be ordered in a file set in accordance with a descending order of |VUL|, where |VUL| refers to the magnitude of the vector, i.e., the number of user IDs allowed to access the files $f_n$. The PDFW engine 203 ranks the files according to the number of user IDs allowed to access them in order to generate the grouping F, such that F:={$f_1, f_2, \ldots, f_n$} is a ranked grouping of files to be written or archived to the magnetic tape media. A value w is the number of wraps of the magnetic tape medium on which the files are written, divided by 2 (bidirectional writing). The value D is a measure for determining files that have as many common users with the preceding file as possible. Thus, D(f1, f2) determines the number of common users between files f1 and f2, for example.

Figure 8:
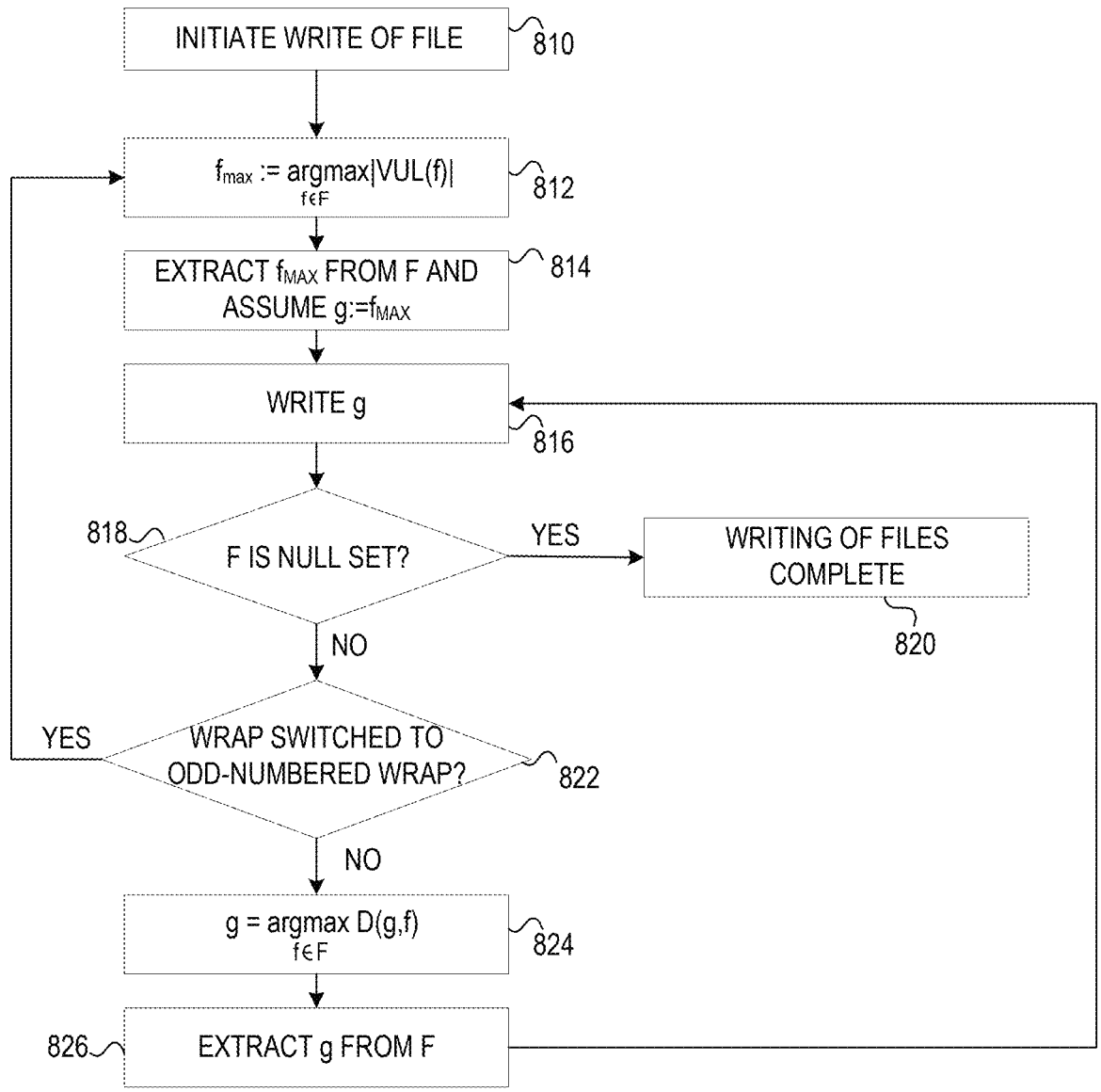
FIG. 8 is a flowchart illustrating an example operation for control writing, or copying, of the files onto the magnetic tape media in accordance with a ranked order based on user identifiers in accordance with one illustrative embodiment.
Figure 9:
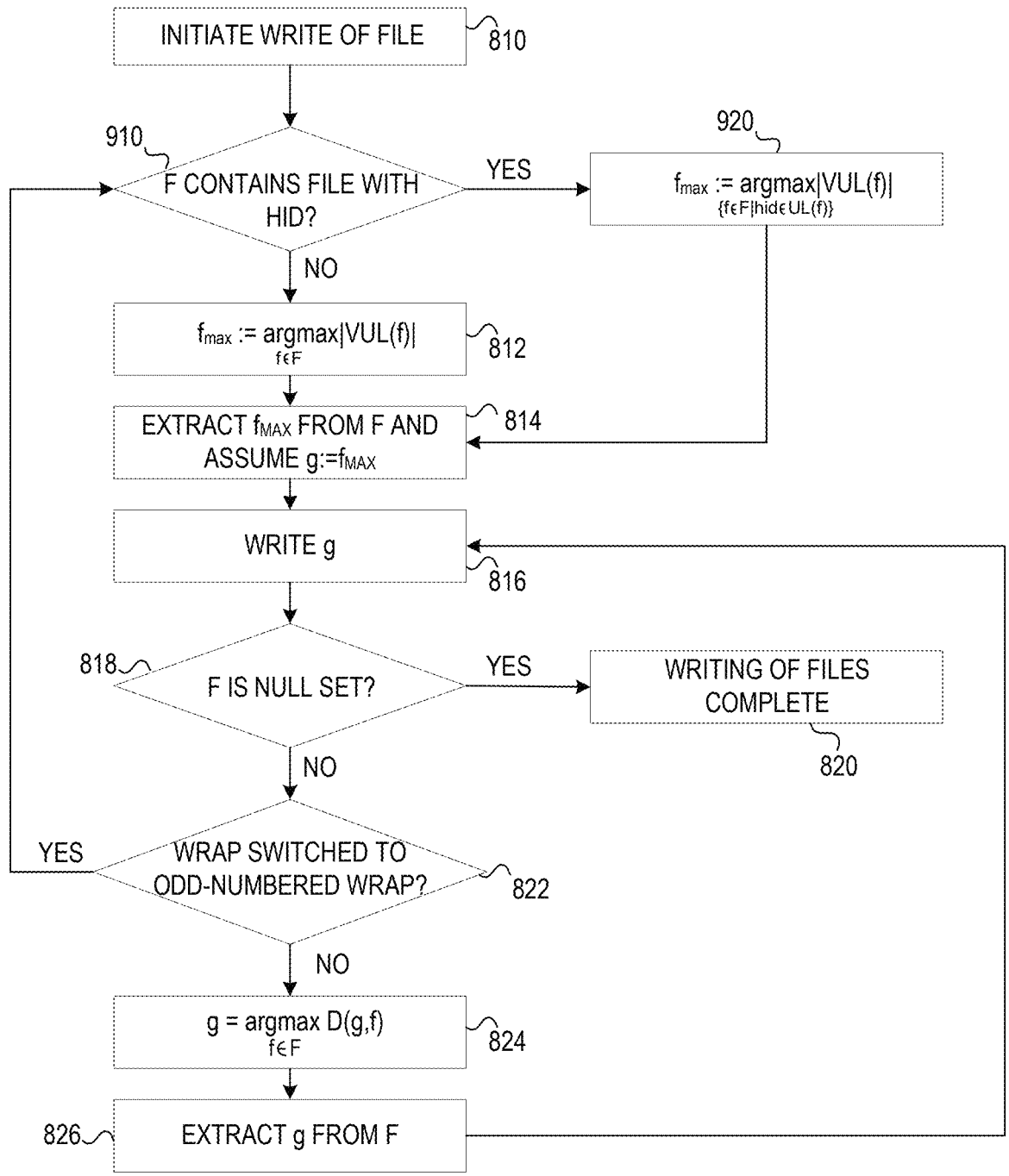
FIG. 9, described hereafter, shows another example for writing files with priority near a beginning boundary of a partition on magnetic tape media in accordance with one illustrative embodiment.

Having identified the ranked grouping of files to be archived, the PDFW engine 203 may then control writing, or copying, of the files onto the magnetic tape media according to process represented in the flowchart of FIG. 8. FIG. 9, described hereafter, shows another example for writing files with priority near a beginning boundary of a partition on magnetic tape media in accordance with one illustrative embodiment. It should be appreciated that the operations outlined in FIGS. 8-9 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 8-9, and may, in some cases, make use of the results generated as a consequence of the operations set forth in FIGS. 8-9, the operations in FIGS. 8-9 themselves are specifically performed by the improved computing tool in an automated manner.

As shown in FIG. 8, after starting the write of a file (step 810), the file ($f_{max}$) with the largest |VUL|, and thus sharing many common users with the preceding file, is selected from the ranked file group F so that it may be written to the magnetic tape media (step 812). The file corresponding to $f_{max}$ is then extracted from the file group F, and is thus, removed from the file group F, and it is assumed that g:=$f_{max}$ (step 814). The operation then writes the file (g) to the magnetic tape medium (step 816).

A determination is made as to whether the grouping of files F is empty or a null set, i.e., all files of the file group F have been written to the magnetic tape medium (step 818). If the file group F is empty, the writing of the files is completed (step 820) and the operation terminates. If the file group F is not empty, then the operation proceeds to step 822.

A determination is made as to whether the writing of the files to the magnetic tape medium results in a switching of the wrap from an even-numbered wrap to an odd-numbered wrap (step 822). When a wrap is switched and the head is located in the vicinity of the starting boundary of the partition, i.e., LP3, a file with the largest |VUL in F is written at that time (step 812). In some illustrative embodiments, whether a wrap is switched with the head located in the vicinity of LP3 can be confirmed by any known of later developed mechanism. Wraps directed to LP4 from LP3 are referred to as even-numbered wraps and wraps directed to LP3 from LP4 are referred to as odd-numbered wraps.

If the writing of data to the magnetic tape medium has switched to an odd-numbered wrap, then the operation returns to step 812. If the writing of data to the magnetic tape medium has not switched to an odd-numbered wrap, i.e., the writing of data is still on an even-numbered wrap, then g is set to argmax D(g, f) for f in the set F (step 824). The files corresponding to g are then extracted from the file group F and the operation returns to step 816 to write the files in g to the magnetic tape medium (step 826).

Thus, with this outlined process for writing files to magnetic tape media, a file with many user IDs allowed to access it is written in the vicinity of LP3. In addition, files that can be accessed by many of the same user IDs as the preceding file may then be written subsequent and in close proximity on the magnetic tape medium to that file. Thus, the files are organized onto the magnetic tape medium such that files that are predicted to be accessed frequently, and files that are predicted to be accessed more often together, are located on the magnetic tape medium closer the starting boundary of a corresponding partition of the magnetic tape medium than other files, in a priority ranking. This will improve not only accessing of files when reading the files from the magnetic tape medium, but also performing searches for files by an external search system, such as an Enterprise Search Server or the like.

That is, to use archived data, an external search system such as Enterprise Search Server may be used to identify a required file which is then read from the magnetic tape medium. The external search system allows users to search for files using search keywords or the like, which can be unpredictable, i.e., it is not known a priori, what search terms a user may use to search for a file. However, with the mechanisms of the illustrative embodiments, it is assumed that a file accessible to many people is more likely to be included in search results than a file accessible to a few people and therefore, considered to be used more frequently. Thus, with the mechanisms of the illustrative embodiments, files that are more likely to be searched for and used are more highly likely to be written in the vicinity of LP3 and thus, the illustrative embodiments operate to reduce time spent for reading files from magnetic tape media.

Moreover, the illustrative embodiments provide for situations in which application of access controls are used to control which users can access which files or data structures written to magnetic tape media, e.g., such as a Secure Search tool. Hence, when multiple files are accessed, those files are highly likely to be accessed by the same user. With the mechanisms of the illustrative embodiments, those files are more highly likely to be written consecutively and therefore can be expected to be read consecutively. For example, when corporate product development information is stored in a Contents Management System, operations may be implemented to restrict which users are authorized to access the product information. This may be accomplished through access control lists or other mechanisms for controlling what user IDs are permitted to access the product information, for example. At that time, with the use of the illustrative embodiments, when reading archived files retrieved based on a search of the product name, those files related to the product will have been written consecutively or in the vicinity of each other on the magnetic tape medium and thus, will be able to be read with lower latency than in known magnetic tape systems.

With the mechanisms of the illustrative embodiments, files with larger numbers of user IDs able to access them, i.e., larger NU, are written in the vicinity of LP3 in the previously depicted examples. In some illustrative embodiments, priority writing of files associated with particular user IDs may also be implemented. That is, in addition to writing files, which have relatively larger numbers of users that can access them, closer to the starting boundary, e.g., LP3, of the partition on the magnetic tape medium, some illustrative embodiments may prioritize the writing of files based on specific user IDs able to access the files. These specific user IDs are referred to as high priority user identifiers, or HIDs. These HIDs may be certain user IDs or group IDs which are expected to read the files more frequently from magnetic tape media and thus, files associated with these HIDs should be written closer to the starting boundary of the partition, i.e., in the vicinity of LP3. For example, users and user groups associated with a human resources department are more highly likely to access past personnel information for the organization/enterprise than other users. Thus, user identifiers and group identifiers associated with the human resources department may be specified as high priority user identifiers (HIDs). As a result, when writing or archiving files from the human resources department onto magnetic tape media, these files may be associated with HIDs belonging to the human resources department and may be written in the vicinity of LP3 with priority.

FIG. 9 outlines an example process for writing files with HID priority near a beginning boundary of a partition on magnetic tape media in accordance with one illustrative embodiment. The operation outlined in FIG. 9 is similar to the operation outlined in FIG. 8 but with additional steps for determining whether files with HIDs associated with them are to be written to the magnetic tape medium and if so, writing those with priority over other files, e.g., see steps 910 and 920. Thus, similar operations to those of FIG. 8 are shown in FIG. 9 with similar reference numerals.

As shown in FIG. 9, similar to FIG. 8, the operation starts by initiating the write of a file (step 810). However, different from FIG. 8, the operation in FIG. 9 then determines whether the files to be written, or archived, to magnetic tape media include a file with an HID (step 910). If so, the operation then proceeds to step 920 where the file with the largest number of users able to access it and which includes the HID is selected (step 920). The operation then proceeds to step 814. If the files to be written, i.e., file group F, does not contain a file with an associated HID, then the operation proceeds to step 812. It should be appreciated that the determination of whether the files to be written includes a file with an associated HID or not may be determined by checking all ACLs of all the files to be written, for example, and matching them to a predetermined listing of HIDs. HIDs may be added to the listing of HIDs in any suitable manner including manual entry or through automated analysis of user activity with regard to the various files to determine if the user accesses files frequently in accordance with one or more predefined thresholds.

As shown in FIG. 9, the file ($f_{max}$) with the largest |VUL|, and thus sharing many common users with the preceding file, is selected from the ranked file group F so that it may be written to the magnetic tape media (step 812). The file corresponding to $f_{max}$ is then extracted from the file group F, and is thus, removed from the file group F, and it is assumed that g:=$f_{max}$ (step 814). The operation then writes g to the magnetic tape medium (step 816).

A determination is made as to whether the grouping of files F is empty or a null set, i.e., all files of the file group F have been written to the magnetic tape medium (step 818). If the file group F is empty, the writing of the files is completed (step 820) and the operation terminates. If the file group F is not empty, then the operation proceeds to step 822.

A determination is made as to whether the writing of the files to the magnetic tape medium results in a switching of the wrap from an even-numbered wrap to an odd-numbered wrap (step 822). When a wrap is switched and the head is located in the vicinity of the starting boundary of the partition, i.e., LP3, a file with the largest |VUL in F is written at that time (step 812). In some illustrative embodiments, whether a wrap is switched with the head located in the vicinity of LP3 can be confirmed by any known of later developed mechanism. Wraps directed to LP4 from LP3 are referred to as even-numbered wraps and wraps directed to LP3 from LP4 are referred to as odd-numbered wraps.

If the writing of data to the magnetic tape medium has switched to an odd-numbered wrap, then the operation returns to step 812. If the writing of data to the magnetic tape medium has not switched to an odd-numbered wrap, i.e., the writing of data is still on an even-numbered wrap, then g is set to argmax D(g, f) for f in the set F (step 824). The files corresponding to g are then extracted from the file group F and the operation returns to step 816 to write the files in g to the magnetic tape medium (step 826).

Thus, the illustrative embodiments provide an improved computing tool and improved computing tool operations/functionality for writing files to magnetic tape media. The improved computing tool and improved computing tool operations/functionality improve the speed by which files may be retrieved from magnetic tape media by positioning files that are more likely to be accessed relatively more frequently near the boundaries of the partitions in the magnetic tape media, and more specifically, closer to the starting boundary of a partition. In this way, the more frequently accessed files will be able to be read faster as it does not require as much movement of the tape head to read the files. Moreover, the illustrative embodiments provide mechanisms for positioning files that are more likely to be read by the same user IDs together on the magnetic tape media. Furthermore, the illustrative embodiments provide mechanisms for designating high priority user identifiers (HIDs) with regard to particular files such that files associated with HIDs in their access control lists may be positioned closer to the boundary and together. All of these mechanisms specifically improve upon existing systems for writing data to magnetic tape media by specifically controlling the writing such that retrieval of the files at a later time can be done with less latency for relatively higher frequently accessed files.

It should be appreciated that while the above illustrative embodiments are described with regard to the PDFW, which supports operations with hierarchical storage management (HSM), the illustrative embodiments are not limited to such. In other illustrative embodiments, the copy tool described previously may be a linear tape file system (LTFS) copy tool, such as the LTFSCP utility, available from IBM Corporation, which is expanded to include the prioritized data file write engine mechanisms and functionality/operations as described hereafter in accordance with one or more illustrative embodiments. For example, in other illustrative embodiments, the extended LTFSCP utility having the mechanisms of the illustrative embodiments may be implemented along with IBM Spectrum archive single drive edition, which is also available from IBM Corporation. While reference is made to IBM-specific hardware and/or software components, it should be understood that aspects of the present invention may be applied equally to other file copy tool technologies and/or storage management system technologies implementing such a file copy tool or other prioritized data file write mechanisms.

Figure 10:
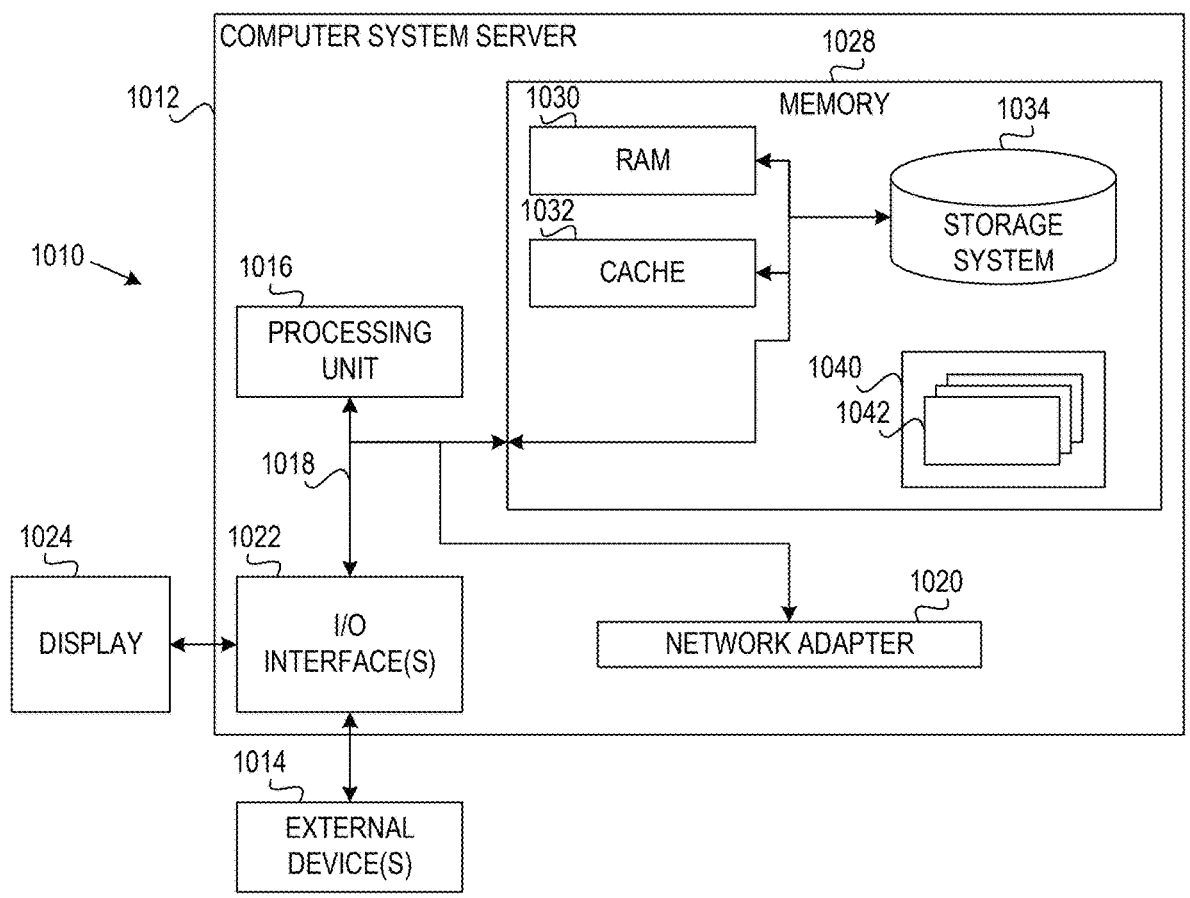
FIG. 10 is a block diagram depicting components of a computer suitable for executing a storage management program comprising the prioritized data file write (PDFW) engine in accordance with at least one illustrative embodiment of the present invention.

FIG. 10 is a block diagram depicting components of a computer suitable for executing a storage management program comprising the prioritized data file write (PDFW) engine in accordance with at least one illustrative embodiment of the present invention. It is understood in advance that although this disclosure includes a detailed description on cloud computing hereafter, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
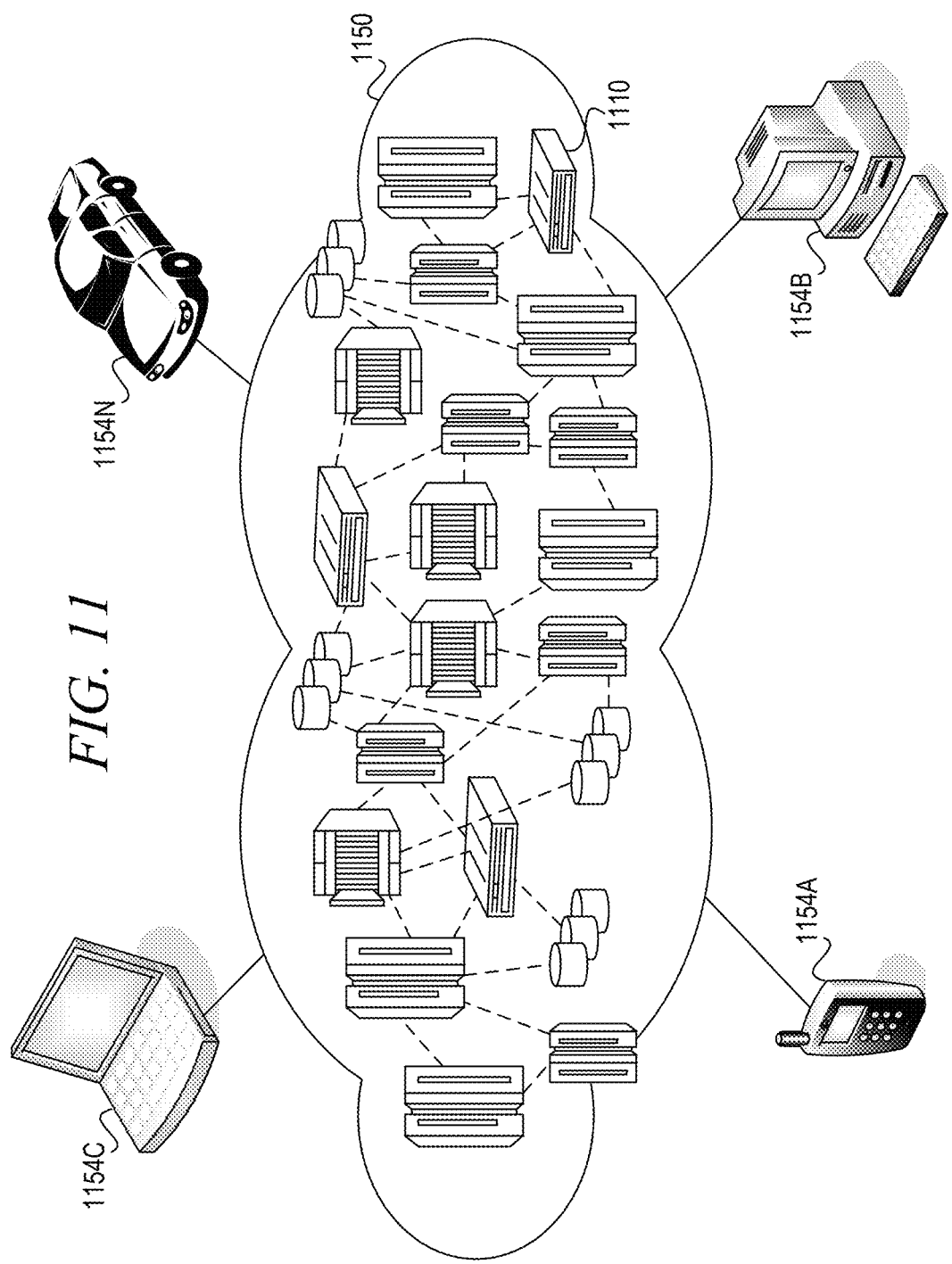
FIG. 11 is a block diagram depicting a cloud computing environment in accordance with at least one illustrative embodiment of the present invention.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
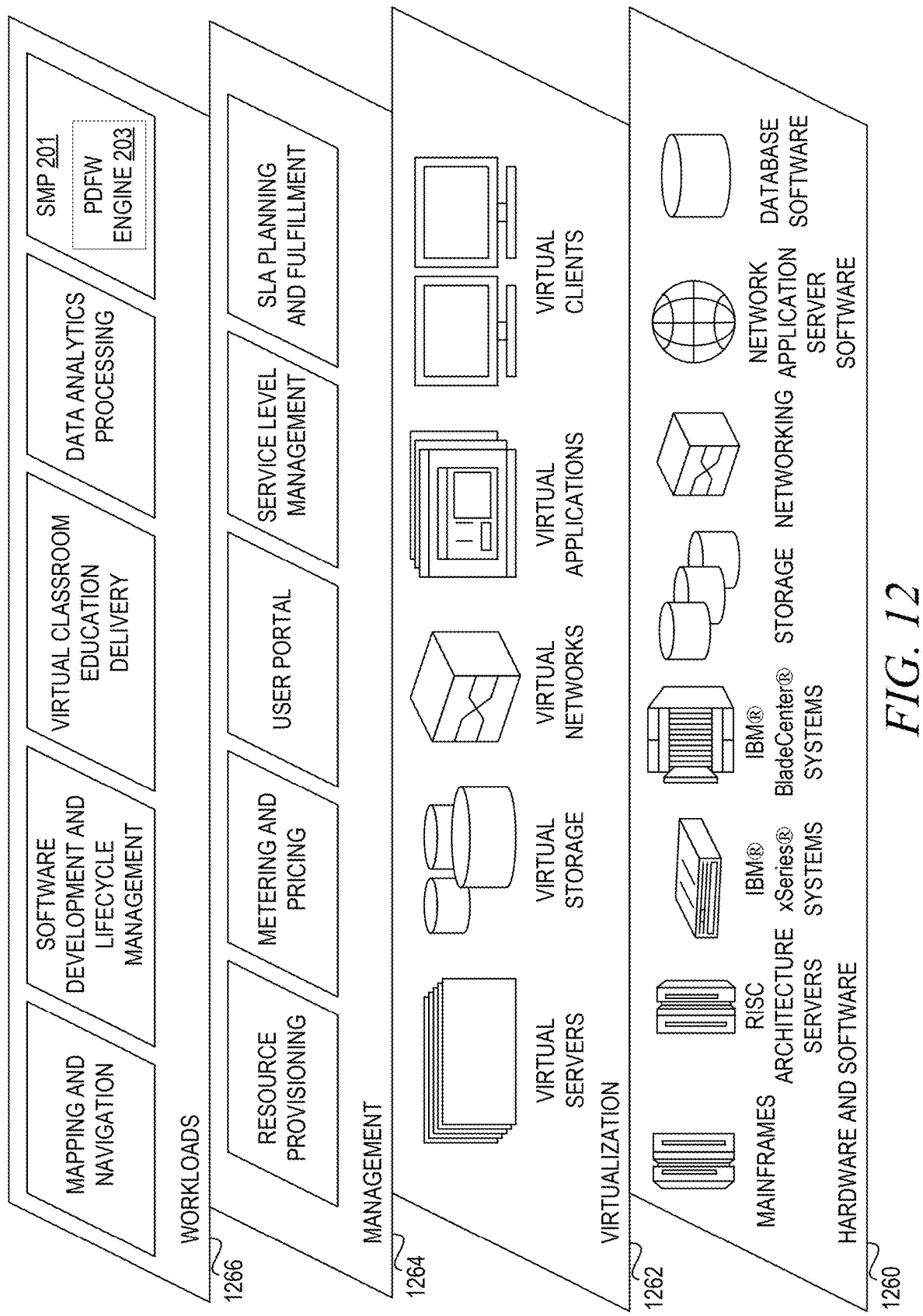
FIG. 12 is block diagram depicting abstraction model layers in accordance with at least one embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage management program (SMP) 201 with corresponding PDFW engine 203 in accordance with one or more of the illustrative embodiments described previously.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for writing files to a tape storage, the method comprising:
   identifying a set of files to be written to the tape storage;
   retrieving, for each file in the set of files, metadata associated with the file indicating identifiers of users associated with the file;
   determining, for each file in the set of files, a predicted frequency metric specifying a predicted frequency of access of the file based on the identifiers of users associated with the file specified in the associated metadata;
   sorting files in the set of files to generate a ranked set of files in which each file is ranked relative to the other files in the set of files based on their corresponding predicted frequency metric; and
   writing the ranked set of files to the tape storage in descending order of predicted frequency metric such that files having relatively larger predicted frequency metrics are written relatively closer to a starting boundary of a partition of the tape storage.

2. The method of claim 1, wherein the metadata associated with the file is an access control list (ACL) specifying at least one of user identifiers or group identifiers associated with users or groups of users that are permitted to access the associated file.

3. The method of claim 2, wherein the predicted frequency metric is a function of a number of unique user identifiers present in the ACL for the file.

4. The method of claim 3, wherein determining the predicted frequency measure comprises performing a lookup of user identifiers associated with group identifiers in a directory database and removing duplicate user identifiers from a listing of user identifiers associated with the file.

5. The method of claim 1, wherein writing the ranked set of files to the tape storage comprises:
   determining a first file, in the set of files, having a largest number of user identifiers that are able to access the first file relative to numbers of user identifiers able to access other second files in the set of files;
   writing the first file to a partition of the tape storage;
   determining a selected second file having a largest number of user identifiers that are able to access the second file relative to numbers of user identifiers able to access other second files in the set of files; and
   writing the selected second file at a location substantially immediately subsequent to the first file in the partition of the tape storage.

6. The method of claim 5, wherein the selected second file is a selected section file having metadata specifying an ACL for the selected second file that includes a user identifier matching a user identifier in an ACL of the first file.

7. The method of claim 5, further comprising:
   determining whether a third file in the set of files has a high priority identifier (HID) associated with the third file, where a HID specifies a user identifier of a user that is determined to access the file frequently; and
   writing the third file to the tape storage at a location in the partition prior to the first file in response to determining that the third file has a HID associated with the third file.

8. The method of claim 1, wherein determining, for each file in the set of files, a predicted frequency metric comprises determining the predicted frequency metric based on a number of unique user identifiers able to access the file, and wherein sorting files in the set of files to generate a ranked set of files is based on both the corresponding predicted frequency metric of the files and a determined commonality of user identifiers associated with different files in the set of files such that files having a relatively greater number of user identifiers in common with each other are ranked closer to each other than files that have a relatively lower number of user identifiers in common with each other.

9. The method of claim 1, wherein the tape storage is part of a hierarchical storage system.

10. The method of claim 1, wherein the method is executed in a prioritized data file write engine of a storage management system, and wherein the prioritized data file write engine is an extension of a file copy tool used for archiving files to magnetic tape storage media of the tape storage.

11. A computer program product comprising a computer readable storage medium having a computer readable program stored therein, wherein the computer readable program, when executed on a computing device, causes the computing device to:
   identify a set of files to be written to a tape storage;
   retrieve, for each file in the set of files, metadata associated with the file indicating identifiers of users associated with the file;
   determine, for each file in the set of files, a predicted frequency metric specifying a predicted frequency of access of the file based on the identifiers of users associated with the file specified in the associated metadata;
   sort files in the set of files to generate a ranked set of files in which each file is ranked relative to the other files in the set of files based on their corresponding predicted frequency metric; and
   write the ranked set of files to the tape storage in descending order of predicted frequency metric such that files having relatively larger predicted frequency metrics are written relatively closer to a starting boundary of a partition of the tape storage.

12. The computer program product of claim 11, wherein the metadata associated with the file is an access control list (ACL) specifying at least one of user identifiers or group identifiers associated with users or groups of users that are permitted to access the associated file.

13. The computer program product of claim 12, wherein the predicted frequency metric is a function of a number of unique user identifiers present in the ACL for the file.

14. The computer program product of claim 13, wherein determining the predicted frequency measure comprises performing a lookup of user identifiers associated with group identifiers in a directory database and removing duplicate user identifiers from a listing of user identifiers associated with the file.

15. The computer program product of claim 11, wherein writing the ranked set of files to the tape storage comprises:
   determining a first file, in the set of files, having a largest number of user identifiers that are able to access the first file relative to numbers of user identifiers able to access other second files in the set of files;
   writing the first file to a partition of the tape storage;
   determining a selected second file having a largest number of user identifiers that are able to access the second file relative to numbers of user identifiers able to access other second files in the set of files; and
   writing the selected second file at a location substantially immediately subsequent to the first file in the partition of the tape storage.

16. The computer program product of claim 15, wherein the selected second file is a selected section file having metadata specifying an ACL for the selected second file that includes a user identifier matching a user identifier in an ACL of the first file.

17. The computer program product of claim 15, wherein the computer readable program further causes the computing device to:
   determine whether a third file in the set of files has a high priority identifier (HID) associated with the third file, where a HID specifies a user identifier of a user that is determined to access the file frequently; and
   write the third file to the tape storage at a location in the partition prior to the first file in response to determining that the third file has a HID associated with the third file.

18. The computer program product of claim 11, wherein determining, for each file in the set of files, a predicted frequency metric comprises determining the predicted frequency metric based on a number of unique user identifiers able to access the file, and wherein sorting files in the set of files to generate a ranked set of files is based on both the corresponding predicted frequency metric of the files and a determined commonality of user identifiers associated with different files in the set of files such that files having a relatively greater number of user identifiers in common with each other are ranked closer to each other than files that have a relatively lower number of user identifiers in common with each other.

19. The computer program product of claim 11, wherein the tape storage is part of a hierarchical storage system.

20. An apparatus comprising:
   at least one processor; and
   at least one memory coupled to the at least one processor, wherein the at least one memory comprises instructions which, when executed by the at least one processor, cause the at least one processor to:
   identify a set of files to be written to a tape storage;
   retrieve, for each file in the set of files, metadata associated with the file indicating identifiers of users associated with the file;
   determine, for each file in the set of files, a predicted frequency metric specifying a predicted frequency of access of the file based on the identifiers of users associated with the file specified in the associated metadata;
   sort files in the set of files to generate a ranked set of files in which each file is ranked relative to the other files in the set of files based on their corresponding predicted frequency metric; and
   write the ranked set of files to the tape storage in descending order of predicted frequency metric such that files having relatively larger predicted frequency metrics are written relatively closer to a starting boundary of a partition of the tape storage.

* * * * *